May 13, 1930. C. STEFFEN, JR 1,757,979
PROCESS FOR CONTINUOUS WASHING OF TRICALCIUM SACCHARATE
Filed Feb. 21, 1924
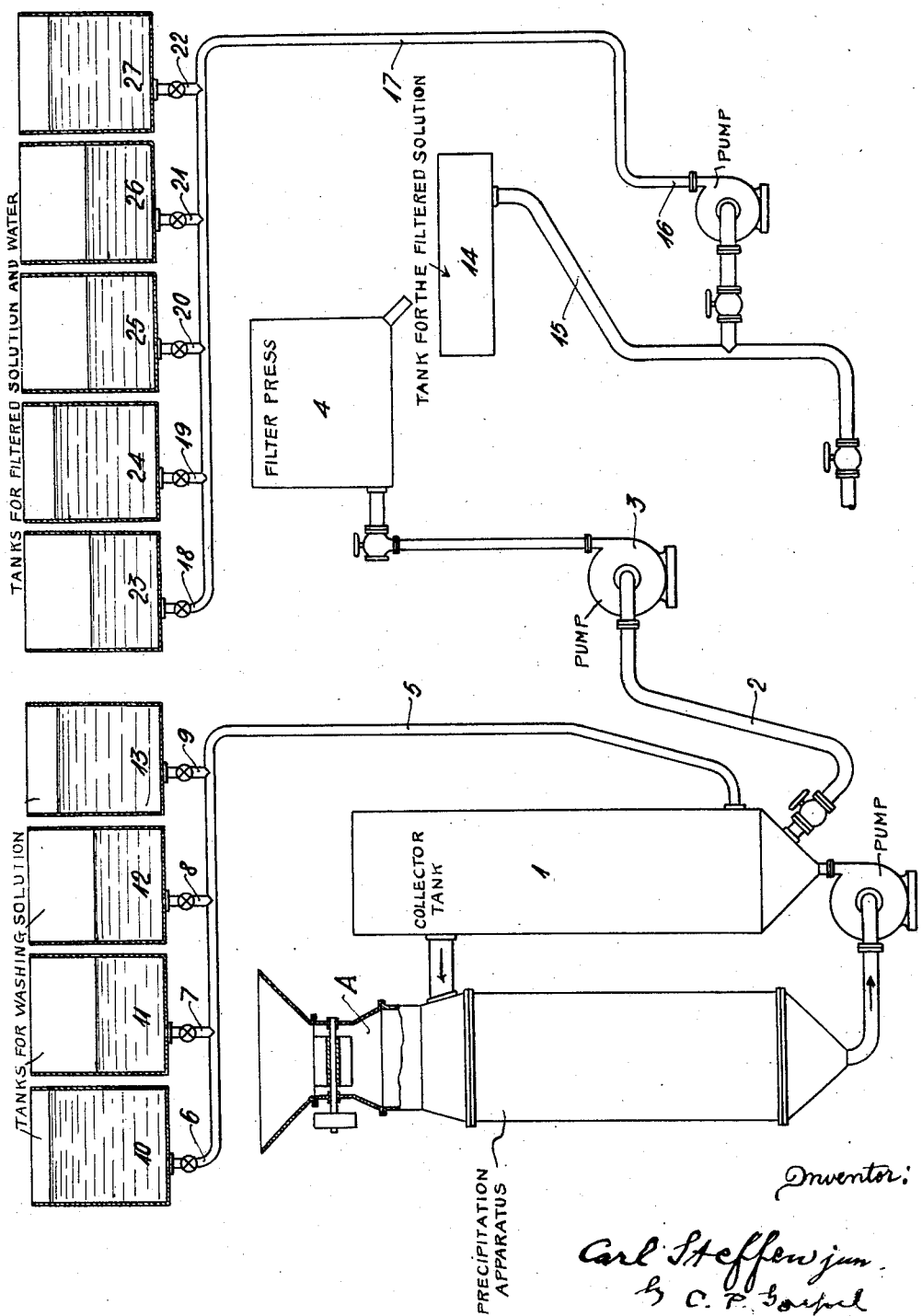

Patented May 13, 1930

1,757,979

UNITED STATES PATENT OFFICE

CARL STEFFEN, JR., OF VIENNA, AUSTRIA

PROCESS FOR CONTINUOUS WASHING OF TRICALCIUM SACCHARATE

Application filed February 21, 1924, Serial No. 694,325, and in Austria February 28, 1923.

This invention relates to a process for continuous washing of tricalcium saccharate, of the kind in which the washing is carried out in a single apparatus, preferably directly in the precipitation apparatus itself, by adding in several successive stages washing solution with a decreasing nonsugar content to the liquid containing the tricalcium saccharate solution. The invention consists in the fact that all the liquids containing tricalcium saccharate, obtained in the apparatus during the several stages, are without previous filtration successively conveyed to the press where the separation of saccharate from the washing solution takes place; the washing solutions separated in the press, are partly discharged as waste washing solutions, and partly—after diluting them if necessary in the well known manner with water—utilized as addition or washing solution in the next precipitation and washing process. The quantity of washing solution added at each washing stage is approximately the same as the quantity of liquid delivered to the press during this stage, the proportion of trisaccharate as well as of nonsugar in the latter liquid constantly decreasing at each stage.

An installation for carrying out the process according to the invention is illustrated by way of example in the accompanying drawing. A pipe 2 leads from the collector tank 1 of a precipitation apparatus A of a well known construction, through a pump 3 to a filter press 4, whilst a second pipe 5 is connected by means of branches 6, 7, 8 and 9 to tanks 10, 11, 12 and 13 respectively. Below the press 4 is mounted a collector tank 14 for the washing solution separated. The tank 14 is on one hand connected by a pipe 15 to a discharge conduit or to a washing solution evaporator, not shown in the drawing, and on the other hand connected by a pump 16 and pipe 17 by branches 18, 19, 20, 21 and 22 to tanks 23, 24, 25, 26 and 27 respectively.

The process may be carried out for instance in the following manner: In the precipitation apparatus A there is a quantity of fluid Q which contains precipitated tricalcium saccharate and nonsugar. In the tank 10 there is a washing solution of a quantity $\frac{3}{4}$ Q and a nonsugar content $k_1$. If from the quantity of fluid Q contained in the apparatus A, a quantity $\frac{3}{4}$ Q is forced by the pump 3 to the filter press 4, then in a measure equal to what is pumped off, the washing solution contained in the tank 10 flows into the apparatus A. The amount of fluid in the precipitation apparatus remains, therefore, constant while the content of tricalcium saccharate and nonsugar decreases as the washing solution from the tank 10 has a lower nonsugar content than the quantity of fluid Q in the precipitation apparatus. If the tank 10 is emptied then the contents of tank 11, which contains $\frac{1}{2}$ Q, is admitted to the precipitation apparatus to the same extent as fluid is carried away from the precipitation apparatus A by the pump 3 to the filter press 4. The washing solution which is contained in the tank 11 contains nonsugar $k_2$ which is less than the nonsugar content $k_1$ of the tank 10 and as this washing solution on its part contains less nonsugar than the fluid in the precipitation apparatus A hence there collects in this tank a fluid of constantly decreasing nonsugar content. If the tank 11 is entirely emptied into the precipitation apparatus then the contents $\frac{1}{2}$ Q of the tank 12 with the nonsugar content $k_3$, introduced to the same extent to the apparatus A, as fluid by the pump 3, is delivered to the filter press 4. The nonsugar content $k_3$ of the tank 12 will again be lower than the nonsugar content $k_2$ of the tank 11. Therefore, after completion of the evacuation of the tank 12 into the precipitation apparatus A the nonsugar content of the fluid in the same will be lower than at the beginning of the evacuation. When the tank 12 has been entirely emptied into the precipitation apparatus then the contents of tank 13 with a nonsugar content $k_4$ will again be delivered to the apparatus A to the same extent as fluid will be drawn off by the pump 3 to the filter press 4. The washing solution from the tank 13 which contains an amount of $\frac{3}{4}$ Q has again a lower nonsugar content than the washing solution from the tank 12 previously used. If therefore all the washing solution from the tank 13 be emptied into the precipitation apparatus A then the nonsugar content will again be lower than at the beginning of the evacuation. After the entire contents of ¾ Q of the tank 13 has been emptied into the precipitation apparatus A then the amount of fluid in the precipitation apparatus A will be as in the beginning.

The entire contents of the precipitation apparatus will be forced by the pump 3 to the filter press 4. Of this quantity of fluid Q, ¼ Q remains in the filter press as fluid content of the expressed tricalcium saccharate.

Each of the valves 6, 7, 8 and 9 is opened only when the respective tank 10, 11, 12 or 13 is to deliver its contents into the precipitation apparatus A.

The profitable use of all the washing solution obtained in the process is as follows:

A part of the washing solution is removed from the operation either by being carried away into the pipe or being subjected to evaporation. This is the part of the washing solution that is obtained while out of the tanks 10 and 11 washing solution is flowing to the precipitation apparatus A. This washing solution has the greatest nonsugar content as it is formed by the mixing of the original precipitating fluid with the washing solution from tanks 10 and 11 which possess the greatest nonsugar concentration in comparison with the other washing solutions. The washing solution flowing from the filter press 4 during the addition of the washing solution from tanks 10 and 11 is therefore conveyed into the pipe or to an evaporator. If the washing solution from tank 12 is introduced into the precipitation apparatus, then the washing solution flowing out of the filter press 4 flows into the tank 14 and thence is delivered by the pump 16 into the tank 23. When the tank 23 is filled with a quantity of fluid ½ Q then the tank 12 is emptied and the washing solution emptied from the tank 13 into the precipitation apparatus A. The washing solution now flowing from the press 4 flows through the tank 14 and is delivered by the pump 16 into the reservoir 24. If, now, the tank 13 is completely emptied into the precipitation apparatus A then also the tank 24 is brought to the desired quantity of fluid of ¾ Q as 13 contained this quantity of fluid. In the precipitation apparatus there is now a quantity of fluid Q which is delivered by the pump 3 to the filter press 4. ¼ Q of the entire fluid remains in the saccharate cakes as fluid content of the expressed saccharate. Therefore, there gradually flows from the press a quantity of fluid ¾ Q which in proportion to its flow finds the following employment. The first quarter is forced out of the tank 14 by the pump 16 into the tank 25 and there with the same amount of water is made up into a quantity of fluid ½ Q. The washing solution thus produced corresponds to the washing solution which in the earlier washing process was contained in the reservoir 11. The second quarter which flows from the press 4 is forced by the pump 16 into the tank 26 and there with the same amount of water is diluted to a quantity of fluid ½ Q and corresponds to the washing solution from the tank 12. The last ¼ Q flowing from the press 4 which has the minimum nonsugar content is delivered by the pump 16 into the tank 27 and there with a quantity of water is diluted from ½ Q to ¾ Q and corresponds to the washing solution from tank 13.

The tricalcium saccharate is obtained by adding lime (CaO) to the solution of raw sugar or of molasses, since the latter contains about 60% sugar and 40% non-sugar. The addition of lime is made for the purpose of obtaining the sugar or saccharides in a nearly insoluble form while the non-sugar remains soluble and therefore, can be carried away by washing with water.

From the above description, it will be understood that in accordance with the fundamental principle of my new process, only the saccharate is retained in the filter, the washing solution of high non-sugar content being progressively replaced by a solution of lower non-sugar content. In other words, the fluids or solutions in the containers 25, 26 and 27 are of successively decreasing non-sugar concentration. The ratio of non-sugar in the solutions in the containers 25, 26 and 27 after the addition of pure water corresponds to that of the fluids or solutions in the tanks 11, 12 and 13 respectively. The liquid which passes through the filter gradually becomes poorer in non-sugar, since it is first taken from the container 11 (or 25) having the higher non-sugar concentration, then from 12 (or 26), and then from 13 (or 27), the solutions in the latter containers successively decreasing in non-sugar. Therefore, it is obvious that the last washing solution running through the filter is poorer in non-sugar than the washing solutions used in the first and intermediate stages of the process. In the filter itself, only tricalcium saccharate is retained during the filtration. The liquid passes through the filters carrying in solution the non-sugar and no part of the latter is retained by the filter, the press cake, as the cycle of the process approaches its end, becoming gradually poorer and poorer in non-sugar. The 25% of liquid retained in the press cake at the start of the process, is therefore, always present but is progressively replaced in the succeeding stages of the process as the liquid is supplied from the containers 11 to 13 or 25 to 27 by an equal quantity of liquid which is of poorer non-sugar content than the liquid which it replaces. In other words, in the press cake liquids of successively decreasing non-sugar content are substituted for liquids richer in non-sugar. It will be understood that the containers 10 to 13 supply the liquid only in starting the process and after starting, the operation is continued with the use of the liquid contained in the tanks 24 to 27. In the container 23 the liquid is stored for fresh precipitation in the tank A. In the start of the process, the liquid supplied from the tanks 10 and 11 is discharged through the outlet valve as being too rich in non-sugar, and after the solution contained in the tanks 12 and 13 has once gone through the process, it is filled into the tanks 23 and 24.

Therefore, at the end of this process the same condition is present as at the beginning so that the washing process in the next precipitation can be carried through again in the same manner.

What I claim is:—

1. The process of continuously treating liquor carrying precipitated tricalcium saccharate comprising adding to the liquor in successive stages a washing solution, the washing solution of each successive stage carrying less non-sugar contents, the so treated liquor at each successive stage carrying a decreasing quantity of calcium saccharate and non-sugar contents, directly filtering the successive liquors and recovering the calcium saccharate and washing solution.

2. The process of continuously treating liquor carrying precipitated tricalcium saccharate comprising adding to the liquor in successive stages a washing solution, the washing solution of each successive stage carrying less non-sugar contents, the so treated liquor at each successive stage carrying a decreasing quantity of calcium saccharate and non-sugar contents, directly filtering the successive liquors, recovering the calcium saccharate and utilizing filtrate washing solution for the treatment of fresh liquor carrying precipitated calcium saccharate.

3. The process of continuously washing tricalcium saccharate resulting from precipitating saccharate liquor with a calcium compound comprising treating the liquor containing tricalcium saccharate in successive stages with washing solutions, each wash carrying a decreasing amount of non-sugar contents, the liquors carrying the tricalcium saccharate at each of the washing stages constantly decreasing in the proportion of tricalcium saccharate and non-sugar contents, press-treating without previous filtration each successive liquor and utilizing each filtrate washing solution for the treatment of fresh liquor carrying precipitated calcium saccharate.

4. The process of continuously treating liquor carrying precipitated calcium saccharate comprising adding directly in the precipitation apparatus itself in successive stages a washing solution, the successive washes carrying a decreasing non-sugar content.

In testimony whereof I have hereunto set my hand.

CARL STEFFEN, Jr.